(12) United States Patent
Farmer et al.

(10) Patent No.: US 8,746,179 B2
(45) Date of Patent: Jun. 10, 2014

(54) PET ENCLOSURE

(71) Applicant: United Pet Group, Inc., Cincinnati, OH (US)

(72) Inventors: Michael Farmer, Southlake, TX (US); Steven J. Behrens, Costa Mesa, CA (US)

(73) Assignee: United Pet Group, Inc., Cincinnati, OH (US)

( * ) Notice: Subject to any disclaimer, the term of this patent is extended or adjusted under 35 U.S.C. 154(b) by 0 days.

(21) Appl. No.: 13/733,739

(22) Filed: Jan. 3, 2013

(65) Prior Publication Data

US 2013/0118415 A1   May 16, 2013

Related U.S. Application Data

(60) Continuation of application No. 13/349,196, filed on Jan. 12, 2012, which is a division of application No. 12/726,193, filed on Mar. 17, 2010, now Pat. No. 8,117,993, which is a continuation of application No. 12/347,696, filed on Dec. 31, 2008, now Pat. No. 7,753,003, which is a division of application No. 11/828,002, filed on Jul. 25, 2007, now Pat. No. 7,703,416, which is a continuation of application No. 11/434,483, filed on May 15, 2006, now abandoned, which is a continuation of application No. 10/460,046, filed on Jun. 12, 2003, now Pat. No. 7,044,083.

(60) Provisional application No. 60/388,514, filed on Jun. 12, 2002.

(51) Int. Cl.
   *A01K 1/035*   (2006.01)

(52) U.S. Cl.
   USPC ........................................ 119/499; 119/474

(58) Field of Classification Search
   USPC ............... 119/499, 474, 496, 482, 497, 498; 135/121, 122, 126, 128, 143
   See application file for complete search history.

(56) References Cited

U.S. PATENT DOCUMENTS

| 1,434,841 | A | | 11/1922 | Pittoni |
| 1,608,242 | A | | 11/1926 | Sava |
| 2,168,913 | A | | 8/1939 | Middleton |
| 2,311,515 | A | * | 2/1943 | Bridge .......................... 135/149 |

(Continued)

FOREIGN PATENT DOCUMENTS

| EP | 0358159 A1 | 3/1990 |
| EP | 0567437 A2 | 10/1993 |
| GB | 2284621 A | 6/1995 |
| JP | 8308417 A | 11/1996 |

*Primary Examiner* — Yvonne Abbott
(74) *Attorney, Agent, or Firm* — Armstrong Teasdale LLP

(57) ABSTRACT

A pet enclosure includes an expandable cover and a collapsible support frame. The cover comprises a roof, a floor opposite the roof, and sides connecting the roof to the floor, wherein the sides include a first side and a second side opposite the first side. The support frame comprises a first truss adjacent the first side, a second truss adjacent the second side, and a support member extending from the first truss to the second truss. The first truss and the second truss are pivotable relative to the support member toward one another into a collapsed configuration of the support frame and away from one another into an uncollapsed configuration of the support frame. Pivoting the trusses from the collapsed configuration into the uncollapsed configuration rearranges the cover from an unexpanded arrangement into an expanded arrangement. The cover in the expanded arrangement defines an interior compartment for housing a pet.

20 Claims, 14 Drawing Sheets

(56) References Cited

U.S. PATENT DOCUMENTS

| | | | | |
|---|---|---|---|---|
| 2,854,948 | A | 10/1958 | Drayson | |
| 2,960,992 | A * | 11/1960 | Klipfel | 135/136 |
| 2,960,993 | A | 11/1960 | Holmstrom | |
| 3,082,780 | A | 3/1963 | Macy | |
| 3,156,213 | A | 11/1964 | Patten | |
| 3,223,098 | A * | 12/1965 | Dole, Jr. | 135/126 |
| 3,330,582 | A | 7/1967 | Morris | |
| 3,405,721 | A | 10/1968 | Crosier et al. | |
| 3,509,891 | A | 5/1970 | Bolt | |
| 3,611,994 | A | 10/1971 | Bailey et al. | |
| 3,848,279 | A | 11/1974 | Ipsen, Jr. | |
| 4,077,418 | A * | 3/1978 | Cohen | 135/95 |
| 4,251,015 | A * | 2/1981 | Gale, Jr. | 224/154 |
| 4,286,612 | A | 9/1981 | Neal et al. | |
| 4,376,318 | A | 3/1983 | Cirillo | |
| 4,397,398 | A | 8/1983 | Watanabe | |
| 4,453,558 | A | 6/1984 | Ochs et al. | |
| 4,590,885 | A | 5/1986 | Sugiura | |
| 4,597,402 | A * | 7/1986 | Morris, Jr. | 135/132 |
| 4,607,656 | A * | 8/1986 | Carter | 135/145 |
| 4,612,948 | A | 9/1986 | Simpson | |
| 4,716,919 | A * | 1/1988 | Griffin | 135/133 |
| 4,748,995 | A | 6/1988 | Viglione | |
| 4,793,286 | A | 12/1988 | Buxton | |
| 4,803,951 | A | 2/1989 | Davis | |
| 4,858,561 | A | 8/1989 | Springer | |
| 4,938,243 | A | 7/1990 | Foster | |
| 4,945,584 | A | 8/1990 | LaMantia | |
| 4,974,621 | A | 12/1990 | Lerma | |
| D317,216 | S | 5/1991 | Cutrone | |
| 5,040,349 | A * | 8/1991 | Onoda et al. | 52/646 |
| 5,072,694 | A * | 12/1991 | Haynes et al. | 119/482 |
| 5,078,096 | A | 1/1992 | Bishop et al. | |
| 5,197,154 | A | 3/1993 | Shamie | |
| 5,249,592 | A | 10/1993 | Springer et al. | |
| 5,335,618 | A | 8/1994 | Zarola | |
| 5,415,255 | A | 5/1995 | Hafner | |
| 5,544,864 | A | 8/1996 | Gabriel-Lacki et al. | |
| 5,615,640 | A | 4/1997 | Luiz | |
| 5,622,198 | A | 4/1997 | Elsinger | |
| 5,626,098 | A | 5/1997 | Askins et al. | |
| 5,800,067 | A | 9/1998 | Easter | |
| 5,803,019 | A | 9/1998 | Heilborn et al. | |
| 5,881,678 | A | 3/1999 | Morley | |
| 5,927,363 | A * | 7/1999 | Olsen | 160/83.1 |
| 6,076,485 | A | 6/2000 | Peeples et al. | |
| 6,082,305 | A | 7/2000 | Burns et al. | |
| 6,098,218 | A * | 8/2000 | Ventura | 5/113 |
| 6,119,288 | A | 9/2000 | Hendrickson | |
| 6,125,483 | A | 10/2000 | Stroud et al. | |
| 6,155,206 | A | 12/2000 | Godshaw | |
| 6,199,572 | B1 | 3/2001 | Rousselle et al. | |
| 6,206,020 | B1 | 3/2001 | Lynch | |
| 6,209,558 | B1 | 4/2001 | Viglione | |
| 6,311,709 | B1 | 11/2001 | Louie et al. | |
| 6,318,394 | B1 | 11/2001 | Zheng | |
| 6,328,050 | B1 | 12/2001 | McConnell | |
| 6,349,434 | B1 | 2/2002 | Zhuang | |
| 6,360,760 | B1 | 3/2002 | Louie et al. | |
| 6,402,220 | B2 * | 6/2002 | Allen | 296/77.1 |
| 6,446,577 | B1 | 9/2002 | Salahor | |
| 6,449,147 | B2 | 9/2002 | Zheng | |
| 6,499,498 | B1 | 12/2002 | Zheng | |
| 6,618,988 | B2 | 9/2003 | Williams et al. | |
| 6,634,152 | B1 * | 10/2003 | Pilkinton | 52/641 |
| 6,644,329 | B2 * | 11/2003 | Tomason | 135/96 |
| 6,688,256 | B1 * | 2/2004 | King | 119/474 |
| 6,715,446 | B2 * | 4/2004 | Chou | 119/497 |
| 6,748,962 | B2 * | 6/2004 | Miller | 135/130 |
| 6,772,458 | B2 | 8/2004 | Ellen et al. | |
| 6,857,246 | B2 * | 2/2005 | Erbetta et al. | 52/653.2 |
| 6,866,009 | B2 * | 3/2005 | Smith et al. | 119/840 |
| 6,883,463 | B2 | 4/2005 | Link | |
| 6,899,057 | B1 * | 5/2005 | Chrisco et al. | 119/498 |
| 6,925,664 | B1 * | 8/2005 | Twigg | 5/113 |
| D512,799 | S * | 12/2005 | Simpson et al. | D30/108 |
| 7,021,242 | B2 | 4/2006 | Axelrod | |
| 7,025,019 | B2 | 4/2006 | Axelrod et al. | |
| 7,210,426 | B2 | 5/2007 | Yeung | |
| 2003/0205601 | A1 | 11/2003 | Kilduff | |
| 2005/0161070 | A1 | 7/2005 | Parsons | |

\* cited by examiner

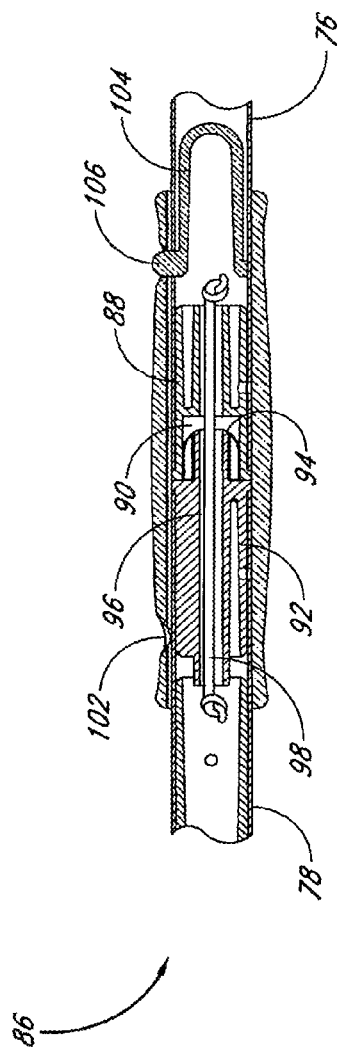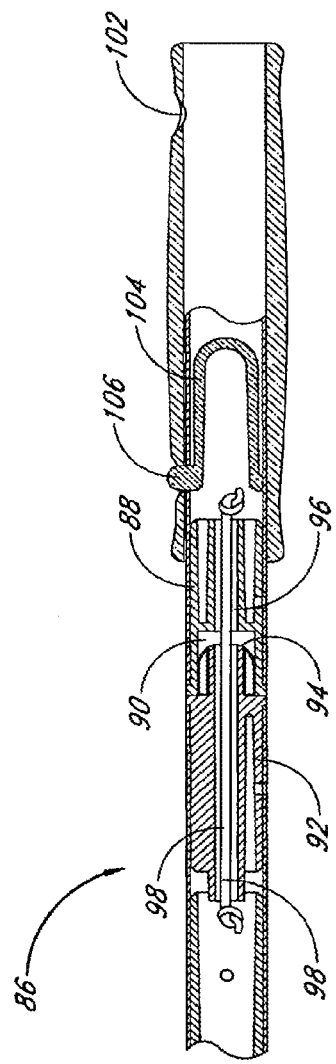

PET ENCLOSURE

CROSS REFERENCE TO RELATED APPLICATIONS

This application is a continuation of U.S. patent application Ser. No. 13/349,196 filed on Jan. 12, 2012, which is a divisional of U.S. patent application Ser. No. 12/726,193 filed on Mar. 17, 2010, which is a continuation of U.S. patent application Ser. No. 12/347,696 filed on Dec. 31, 2008. U.S. patent application Ser. No. 12/347,696 is a divisional of U.S. patent application Ser. No. 11/828,002 filed on Jul. 25, 2007, which is a continuation of U.S. patent application Ser. No. 11/434,483, filed on May 15, 2006, which is a continuation of U.S. patent application Ser. No. 10/460,046, filed on Jun. 12, 2003. U.S. patent application Ser. No. 10/460,046 claims priority to U.S. Provisional Patent Application Ser. No. 60/388,514, filed on Jun. 12, 2002. The entire content of each of the priority applications is hereby incorporated by reference.

FIELD OF THE INVENTION

The present invention relates to animal enclosures. More particularly, the present pet enclosure includes a collapsible one-piece frame that provides for easy set up of the enclosure as well as portability without the need to keep track of multiple pieces. Advantageously, the enclosure includes a completely removable and washable fabric cover.

BACKGROUND OF THE INVENTION

Many pet owners enjoy taking their pet along with them when they travel. For example, when taking an extended road trip, many pet owners like to have their pet's companionship for the trip. Taking the pet along is often preferable to hiring someone to take care of the pet or putting the pet in a kennel. Many pets suffer separation anxiety when their owner is away. The anxiety can cause the pet to chew on furniture, urinate on the carpet, and generally wreak havoc around the house. When the owner returns, the damage causes the owner unnecessary aggravation and repair expense.

Several pet carriers are available that owners can use to conveniently transport their pets. For example, U.S. Pat. Nos. 6,076,485 and 6,155,206 disclose collapsible pet carriers. However, when the owner arrives at his or her destination, often there is no convenient area in which to leave the pet. Pet carriers, such as those described in the above patents, are designed to be small and easy to carry. Consequently, they are generally confining for the pet. They do not have much interior space in which the pet can stretch out.

Leaving the pet in a car is dangerous to the pet. If the temperature outside the car is cold, then the car interior will be cold and the pet may become sick. Conversely, if it is a warm day and the sun is shining, the sun's radiation can cause the interior of the car to reach dangerously hot temperatures. Further, while in the car the pet may suffer from separation anxiety. The pet may then cause the same problems described above.

If the owner is visiting a friend's or relative's home, he or she may sometimes bring the pet into the home. However, many homeowners are sensitive to the problems that pets can cause, such as odors or damage from chewing or scratching. Further, some homeowners are allergic to pet dander, which pets usually leave behind on carpet and/or furniture. Therefore, letting the pet roam free indoors is not always possible. Further, many homes do not have suitable outdoor areas in which the pet may roam. Homes located in heavily populated urban areas often do not have enough outdoor area for the pet to occupy. Homes in more rural areas may not have fencing to contain the pet. The pet could thus wander off and be lost or struck by a car.

A number of portable pet enclosures are available to pet owners. Pet owners can thus bring their pets along with them almost anywhere they go. When the owner arrives at his or her destination, he or she sets up the enclosure, indoors or out, and places the pet inside. The pet is safely contained and cannot wander off. The enclosure is ventilated to prevent the temperature inside from becoming too hot. If the enclosure is placed indoors, the enclosure prevents direct contact between the pet and the surroundings, thus reducing odors or dander that the pet might otherwise leave behind.

U.S. Pat. No. 5,335,618 (the '618 patent) discloses an example of a collapsible animal enclosure. The enclosure has a house unit 10 with spaced side walls 14 and a roof 16 of pliable material, and opposite ends 20, 22 forming an enclosed area for housing an animal. Each end wall has an opening 24, 26 for allowing entry to and exit from the enclosure. Support bows 28 extend transversely across the side walls and roof for holding the side walls and roof in an open, spread apart condition. The house unit is convertible between a use configuration in which the opposite ends are spread a maximum distance apart and a collapsed configuration in which the ends are pushed inwardly towards one another, collapsing the pliable material between the ends in an accordion-like manner. Longitudinal spreader bars 32 disposed at either end in pockets 34 at opposite ends of the house unit maintain the house unit in the use configuration. An extended run unit 12 of similar construction to the house unit is releasably securable to one end of the house unit to provide an extended exercise area.

The enclosure of the '618 patent is constructed of multiple pieces that are difficult to keep track of when the enclosure is collapsed. To collapse the house unit, a pet owner removes the spreader bars and floor, and may also remove the support bows. When storing or transporting the enclosure, these separate pieces are cumbersome to carry and are easily lost.

The design of the enclosure of the '618 patent makes accessing the interior of the enclosure difficult. The openings of the enclosure are located on the end walls. Thus, when a pet owner places his or her pet inside the enclosure, he or she must move quickly to seal the opening before the pet runs back out. Also, when a pet owner wants to briefly open the enclosure with his or her pet inside, for example to play with the pet or insert or remove a food or water dish, the pet can easily exit the enclosure by running through the opening.

Another example of a portable pet enclosure is manufactured by Cabana Crate Co. The enclosure comprises a nylon cover stretched about a frame that is substantially in the shape of a rectangular parallelepiped. The frame comprises aluminum tubing that is sewn into the cover. The tubes are sandwiched between layers of the cover material. The front, back and side walls of the cover are mesh, allowing air to circulate through the enclosure. A zipper connects the front wall to the side walls and floor. Unzipping the zipper enables a pet owner to access the interior of the enclosure.

Because the Cabana enclosure opens along its front wall, it provides an easy escape route for the pet whenever the door is open. Also, because the frame tubes are integral with the cover, the cover is not removable from the frame. The cover is thus difficult to clean. It cannot be machine washed, because the frame cannot be placed in a washing machine together with the cover. Further, the area between the layers of cover material, in which the tubes reside, tends to trap dirt, pet hair, pet dander, etc. And if the pet has an "accident" inside the Cabana enclosure, this area traps the pet's waste and leaves the enclosure with an odor that is difficult to remove.

Therefore, a portable pet enclosure from which pets cannot easily escape, that is not constructed of a multitude of pieces that are easy to lose, and that is easy to clean, would be of great benefit to pet owners.

SUMMARY OF THE INVENTION

The preferred embodiments of the pet enclosure have several features, no single one of which is solely responsible for their desirable attributes. Without limiting the scope of this pet enclosure as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include integration of parts into a one-piece frame, easy transportability, easy washability, and easy access to the enclosure interior without enabling a pet's escape.

A preferred embodiment of the present pet enclosure comprises a rigid support frame and a cover. The frame is constructed of a rigid floor, first and second rigid end trusses, and at least one jointed support member extending between the end trusses.

Another preferred embodiment of the present pet enclosure comprises a support frame for a pet enclosure. The support frame comprises a floor member, a first end truss, a second end truss and at least one support member. The trusses are each constructed of at least one rigid member. The first and second end trusses are preferably hingedly connected to the floor truss. The at least one support member has a first end and a second end. The first end is hingedly connected to the first end truss, and the second end is hingedly connected to the second end truss.

Another preferred embodiment of the present pet enclosure comprises a joint for releasably connecting a first member and a second member. The joint comprises a first connector and a second connector. The first connector is secured to an end of the first member, and the second connector is secured to an end of the second member. Preferably, an elasticized member extends between the ends of the first and second members. A locking sleeve is slidable on the members between a first position in which the sleeve is adjacent a junction of the ends of the first and second members, and a second position in which the sleeve covers the junction.

Another preferred embodiment of the present pet enclosure comprises a rigid frame for a pet enclosure. The frame comprises a bottom truss, end trusses hingedly secured to opposite ends of the bottom truss, and at least one jointed support tube extending between the end trusses.

Another preferred embodiment of the present pet enclosure comprises a method of folding a pet enclosure, wherein the pet enclosure comprises a jointed frame and a cover. The method comprises the steps of bending a jointed frame support member, folding a first frame end truss toward a frame floor member, folding a second frame end truss toward the floor member, and securing a first portion of the cover to a second portion of the cover, thereby resisting unfolding of the enclosure.

Another preferred embodiment of the present pet enclosure comprises a rigid support frame and a cover. The frame is constructed of a rigid roof truss, first and second rigid end trusses, and at least one jointed support member extending between the end trusses.

Any of the above embodiments may further comprise a fabric cover. The cover may be stretchable over the frame, or be supported externally by the frame. The cover is preferably completely removable from the frame so that it is easily machine washed.

Another preferred embodiment of the present pet enclosure comprises a support frame for a pet enclosure. The support frame comprises a floor member defining a floor plane. The floor member includes at least a first pair of lugs that extend away from the floor plane and define a first pivot axis that is spaced from the floor plane. The floor member further includes at least a second pair of lugs that extend away from the floor plane and define a second pivot axis that is spaced from the floor plane. A first truss is pivotably connected to the first pair of lugs at the first pivot axis, and a second truss is pivotably connected to the second pair of lugs at the second pivot axis. The second pivot axis is spaced from the floor plane a greater distance than the first pivot axis.

Another preferred embodiment of the present pet enclosure comprises a support frame for a pet enclosure. The support frame comprises a floor member, a first truss pivotably connected to the floor member at or near a first end thereof, and a second truss pivotably connected to the floor member at or near a second end thereof. The support frame further comprises at least one support member having a first end and a second end, the first end being pivotably connected to the first truss and the second end being pivotably connected to the second truss. The at least one support member comprises a first section and a second section, the first and second sections being separate pieces that are connectable to one another at a free end of each. The first section and the second section are of unequal lengths.

Another preferred embodiment of the present pet enclosure comprises a support frame for a pet enclosure. The support frame comprises a floor member, a first truss pivotably connected to the floor member at or near a first end thereof, and a second truss pivotably connected to the floor member at or near a second end thereof. The support frame further comprises at least one support member having a first end and a second end, the first end being pivotably connected to the first truss and the second end being pivotably connected to the second truss. A locking sleeve is slidable on the at least one support member between a first position and a second position. The at least one support member comprises a first section and a second section, the first and second sections being separate pieces that are connectable to one another at a free end of each. When the locking sleeve occupies the first position the free ends of the first section and the second section may be separated from one another, and when the locking sleeve occupies the second position the free ends of the first and second sections may not be separated from one another.

Another preferred embodiment of the present pet enclosure comprises a support frame for a pet enclosure. The support frame comprises a floor member, a first truss pivotably connected to the floor member at or near a first end thereof, and a second truss pivotably connected to the floor member at or near a second end thereof. The support frame further comprises at least one support member having a first end and a second end, the first end being pivotably connected to the first truss and the second end being pivotably connected to the second truss. A locking sleeve including a first through-hole and a second through-hole is slidable on the at least one support member between a first position and a second position. The support frame further comprises a push-button mechanism associated with the locking sleeve. The push-button mechanism cooperates with the first through-hole and the second through-hole to releasably lock the locking sleeve in the first position and the second position, respectively.

Another preferred embodiment of the present pet enclosure comprises a cover and a support frame. The cover comprises a bottom panel, a top panel opposite the bottom panel, and a plurality of side panels extending between the bottom panel and the top panel to define an interior space of the cover. An aperture is defined in at least one of the top panel and one of the plurality of side panels for accessing the interior space. The support frame is pivotable between a collapsed configuration and an upright configuration and is insertable into the interior space of the cover through the aperture in the collapsed configuration of the support frame. The support frame is also pivotable from the collapsed configuration to the upright configuration while disposed within the interior space of the cover.

A preferred embodiment of a cover for a pet enclosure having a support frame that is pivotable between a collapsed configuration and an upright configuration comprises a bottom panel, a top panel opposite the bottom panel, and at least one side panel extending between the bottom panel and the top panel. The bottom panel, the top panel, and the at least one side panel collectively define an interior space of the cover. The top panel comprises an aperture and a closure for selectively covering and uncovering the aperture to provide access to the interior space through the aperture. The support frame can be inserted into the interior space in the collapsed configuration and pivoted between the collapsed configuration and the upright configuration while being disposed within the interior space.

A preferred method of folding an embodiment of the present pet enclosure that includes a cover and a support frame is also provided. The cover has a plurality of panels defining an interior space and at least one aperture providing access to the interior space, and the support frame is pivotable between a collapsed configuration and an upright configuration. The method comprises inserting the support frame through the aperture in the cover and into the interior space while the support frame is in the collapsed configuration. The method further comprises folding the cover atop of the collapsed support frame such that the cover is configured to be at least one of transported and stored with the collapsed support frame being disposed within the interior space.

Another preferred embodiment of the present pet enclosure comprises a cover and a collapsible support frame. The cover comprises a bottom panel, a top panel opposite the bottom panel, and a plurality of side panels extending between the bottom panel and the top panel to define an interior space of the cover, wherein an aperture is defined in the cover for accessing the interior space. The collapsible support frame is configured for insertion into the interior space of the cover via the aperture, and the support frame comprises a floor arrangement, a first truss hingedly connected to the floor arrangement, and a second truss hingedly connected to the floor arrangement opposite the first truss. The first truss and the second truss are movable relative to one another within the interior space of the cover between a collapsed configuration of the support frame and an uncollapsed configuration of the support frame.

Another preferred embodiment of the present pet enclosure comprises an expandable cover and a collapsible support frame. The expandable cover comprises a roof, a floor opposite the roof, and a plurality of sides connecting the roof to the floor, wherein the plurality of sides includes a first side and a second side opposite the first side. The collapsible support frame comprises a first truss adjacent the first side of the cover, a second truss adjacent the second side of the cover, and a support member extending from the first truss to the second truss. The first truss and the second truss are pivotable relative to the support member toward one another into a collapsed configuration of the support frame and away from one another into an uncollapsed configuration of the support frame. Pivoting the trusses from the collapsed configuration into the uncollapsed configuration rearranges the cover from an unexpanded arrangement of the cover into an expanded arrangement of the cover. The cover in the expanded arrangement defines an interior compartment for housing a pet.

Another preferred embodiment of the present pet enclosure comprises an expandable cover and a collapsible support frame. The expandable cover comprises a roof, a floor opposite the roof, and a plurality of sides connecting the roof to the floor. The plurality of sides includes a first side, a second side opposite the first side, a third side extending from the first side to the second side, and a fourth side extending from the first side to the second side opposite the third side. The collapsible support frame comprises a first truss adjacent the first side, a second truss adjacent the second side, a support member extending from the first truss to the second truss along one of the roof and the floor, and a brace sized to extend from the first truss to the second truss along the other of the roof and the floor. The first truss and the second truss are maintained in a substantially parallel, upright orientation relative to one another when the brace is positioned to extend from the first truss to the second truss such that the support frame assumes an uncollapsed configuration and arranges the cover in an expanded arrangement in which the cover defines an interior compartment for housing a pet. The first truss and the second truss are pivotable toward one another relative to the support member when extension of the brace from the first truss to the second truss is removed such that the support frame assumes a collapsed configuration and rearranges the cover into an unexpanded arrangement in which the cover does not define the interior compartment for housing a pet.

Another preferred embodiment of the present pet enclosure comprises a rigid, rectangular floor panel, a first rigid end truss positioned adjacent a first end of the floor panel, a second rigid end truss positioned adjacent a second end of the floor panel, a rigid support member extending between upper ends of the first and second rigid end trusses, and a fabric cover disposed about the floor panel and the support member. The cover includes a floor panel, a top panel, first and second side panels, and first and second end panel. The floor panel of the cover is constructed of a durable, substantially non-breathable material. At least one of the first and second side panels, and at least one of the first and second end panels includes breathable mesh material portions. The front panel further includes a front recloseable opening, a portion of the front recloseable opening being permanently secured to the cover, and a remaining portion of the front recloseable opening being releasably secured to the cover.

Other objects and features will be in part apparent and in part pointed out hereinafter.

BRIEF DESCRIPTION OF THE DRAWINGS

The preferred embodiments of the pet enclosure, illustrating its features, will now be discussed in detail. These embodiments depict the novel and non-obvious pet enclosure shown in the accompanying drawings, which are for illustrative purposes only. These drawings include the following figures, in which like numerals indicate like parts:

FIG. 13 is a cross-sectional detail view of the frame of FIG. 3, illustrating the joint and locking sleeve in the locked position;

FIG. 14 is a cross-sectional detail view of the frame of FIG. 3, illustrating the joint and locking sleeve in the unlocked position;

Corresponding reference characters indicate corresponding parts throughout the drawings.

DETAILED DESCRIPTION OF THE PREFERRED EMBODIMENTS

Figure 1:
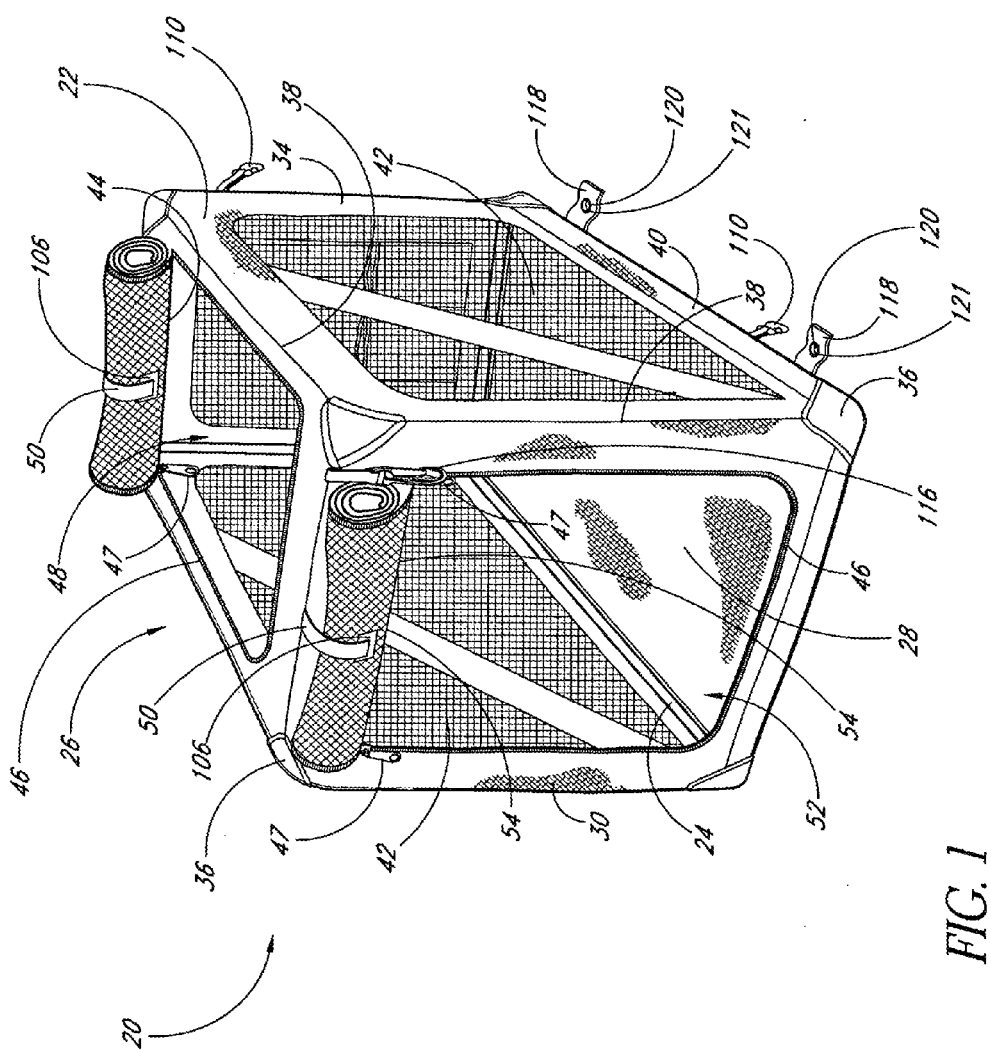
FIG. 1 is a front perspective view of a preferred embodiment of the present pet enclosure.
Figure 2:
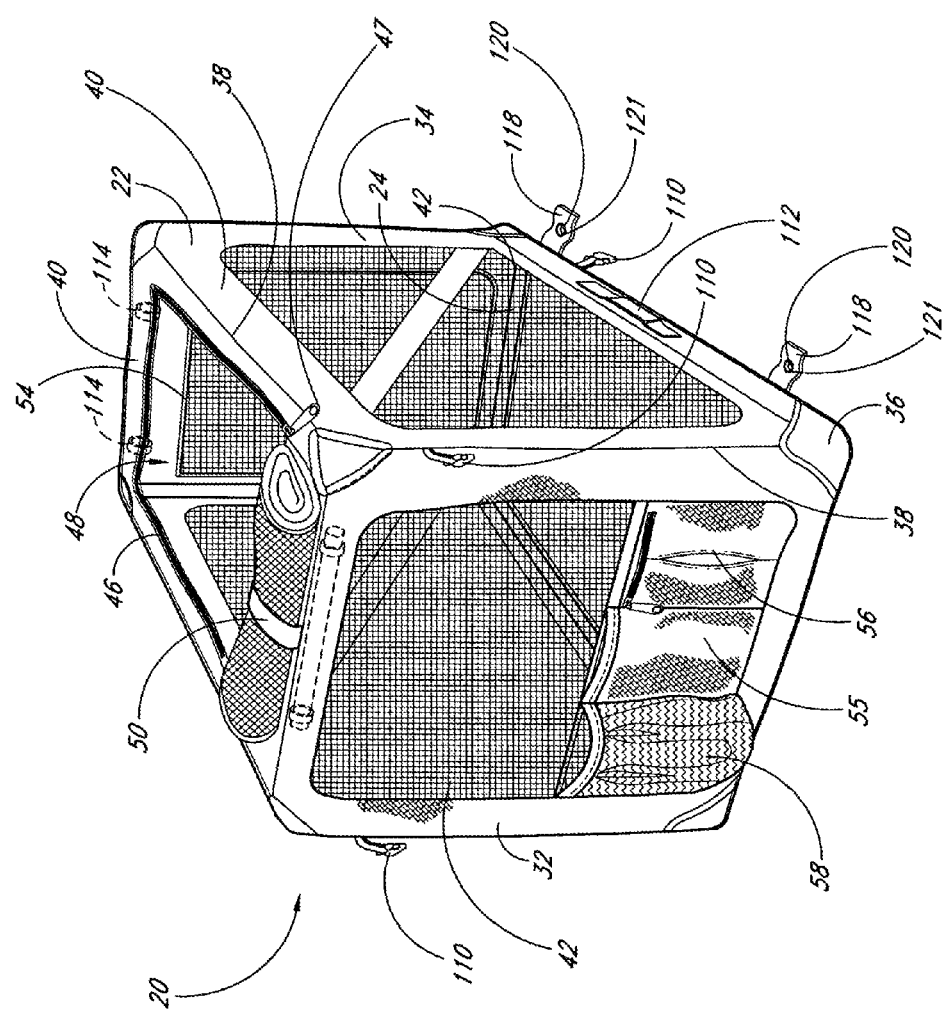
FIG. 2 is a rear perspective view of the pet enclosure of FIG. 1.
Figure 18:
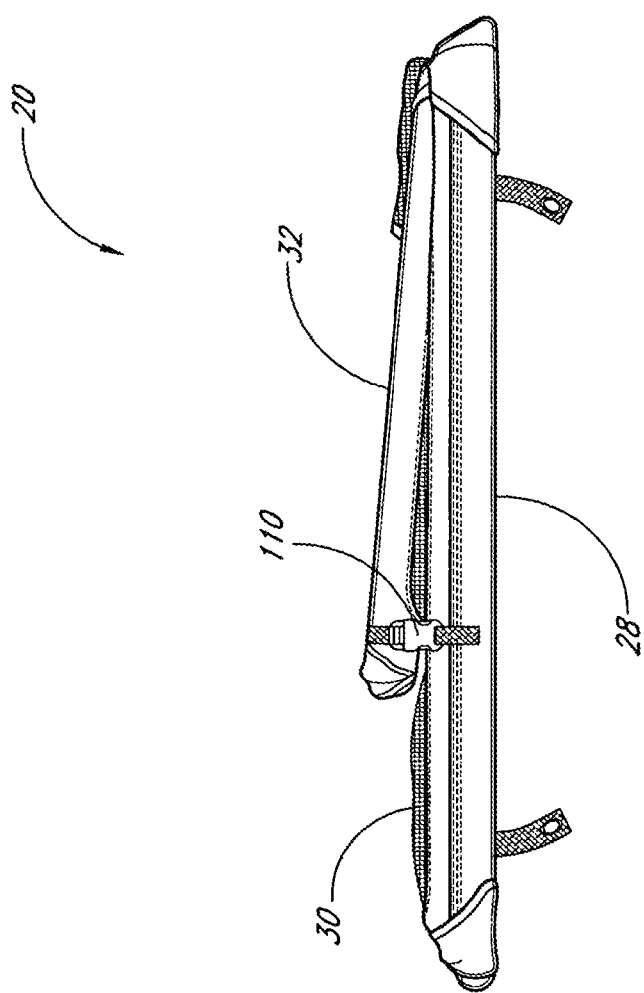
FIG. 18 is a side elevation view of the pet enclosure of FIG. 1, illustrating the pet enclosure in a folded configuration.

The present pet enclosure 20, pictured in FIGS. 1, 2 and 18, comprises a fabric cover supported by a rigid frame 24. In the illustrated embodiment, the enclosure 20 is shaped generally as a six-sided rectangular box, having a top panel 26, a floor panel 28, a front panel 30, a rear panel 32, and two side panels 34. Those of skill in the art will appreciate that the enclosure 20 could have any number of sides, and could be a variety of other shapes and sizes. The enclosure 20 is preferably available in a variety of sizes to accommodate pets of different sizes.

The cover 22 is preferably constructed of a lightweight but durable fabric that is resistant to being torn by pet teeth or claws, and can withstand repeated machine washing and drying without wearing out or shrinking. A preferred material is nylon. Those of skill in the art will appreciate that other materials could be used, such as canvas or plastic. Corners of the enclosure 20 preferably include reinforcing patches 36. Each patch 36 is substantially triangular, with each corner of each triangle residing along a border edge 38 of two contiguous panels 26, 28, 30, 32, 34. The patches 36 are preferably constructed of a durable material, such as nylon or leather. The patches 36 not only reinforce the cover 22 and increase its life span, but they also provide a cushion so that the corners of the enclosure 20 are less likely to damage objects that they strike.

The cover 22 preferably includes substantially non-breathable fabric portions 40 and breathable mesh portions 42 that enable air to circulate through the enclosure 20. In the illustrated embodiment, the floor panel 28 is constructed of only non-breathable fabric 40, while the remaining panels 26, 30, 32, 34 are constructed of a combination of non-breathable fabric 40 and breathable mesh 42. Each of these panels 26, 30, 32, includes a central mesh portion 42 surrounded by a fabric border 40. The side panels 34 may also include a fabric portion 40 running diagonally through the central mesh portion 42. Those of skill in the art will appreciate that the panels 26, 28, 30, 32, 34 could comprise a variety of other combinations of fabric and mesh portions. For example, some panels could comprise entirely mesh, or entirely fabric, or the sizes and/or shapes of the mesh and fabric portions could be different.

Opaque shades (not shown) could be provided to selectively cover the mesh portions 42 of each panel. For example, flaps could be sewn or otherwise secured to one or more of the panels 26, 30, 32, 34. When flat, the flaps could cover the mesh portions 42, and be secured in place with zippers, snaps, or the like. In this configuration, the flaps would provide privacy to a pet inside the enclosure 20. The flaps would also prevent sunlight from entering the enclosure 20, which would keep the pet cooler on hot sunny days. Likewise, the flaps would prevent wind and rain from entering the enclosure 20, which would keep the pet warmer and drier on cold rainy days. When rolled up or removed, the flaps could be secured adjacent the mesh portions 42 with straps or the like. In this configuration, the flaps would enable air and sunlight to enter the enclosure 20.

The enclosure 20 may also include a waterproof canopy (not shown). The canopy may comprise a canvas or nylon sheet large enough to stretch over the enclosure 20. The enclosure 20 may support the canopy directly, or the canopy may be supported with substantially vertical poles, guy wires and stakes. The canopy may be integral with the enclosure 20, or an independent structure. The canopy provides shelter from rainstorms, keeping the interior of the enclosure 20 dry so that a pet can be left outdoors inside the enclosure 20 even on rainy days.

A first edge 44 of the mesh portion 42 of the top panel 26 is preferably stitched to the fabric portion 40. The remaining three edges of the mesh portion 42 are releasably secured to the fabric portion 40 with a zipper 46, which is actuated by one or more zipper pull tabs 47. The top panel 26 thus includes a recloseable top opening 48 that provides access to the interior of the enclosure 20. A pet owner can easily place a pet into, or remove a pet from, the enclosure 20 through the top opening 48. Because the top opening 48 is located in the top panel 26, a pet within the enclosure 20 cannot easily escape from the enclosure 20 when the top opening 48 is unzipped. Thus, when the pet is within the enclosure 20, the owner can add or remove items through the top opening 48, such as food and water dishes, toys or blankets, without having to guard against the pet escaping. The owner can also interact with the pet through the top opening 48. For example, the owner can pet the animal, brush its fur, etc.

The top panel 26 of the cover 22 preferably includes a retaining strap 50 secured near the first edge 44 of the mesh portion 42 forming the top opening 48. An end of the strap 50 preferably includes securing means (not shown), such as a button, snap or hook-and-loop fastener. When the mesh portion 42 is unzipped and rolled up, as shown in FIG. 1, the strap 50 is securable around the rolled up mesh portion 42. The securing means on the strap 50 is attachable to a mating securing means 106 that is preferably attached to an inside surface of the open mesh portion 42, or to an inside surface of the cover 22.

The cover 22 also preferably includes a second recloseable opening 52 in the front panel 30. Like the top opening 48, the front opening 52 comprises a mesh portion 42 that is stitched along a first edge 54 to a fabric border portion 40. The remaining three edges are releasably secureable to the fabric border 40 with a zipper 46, which is also actuated by one or more zipper pull tabs 47. The front opening 52 enables a pet owner to allow his or her pet to enter and exit the enclosure 20 without assistance from the owner. For example, if the pet is heavy or otherwise difficult to pick up and place in the enclosure 20 through the top opening 48, the owner can open the front opening 52 and urge the pet into or out of the enclosure 20.

The cover preferably includes a security snap clip 116 (FIG. 1). The clip 116 is insertable through holes in the zipper pull tabs 47, and locks the front opening 52. The clip 116 is anchored to the cover 22. If both zipper pull tabs 47 are located near the clip 116, and the clip 116 is inserted into the pull tab 47 that would be used to unzip the front opening 52, then that zipper 46 is immobilized and the front opening 52 cannot be opened. The pet inside the enclosure 20 thus cannot unzip the front opening 52 in order to escape from the enclosure 20. A second clip 116 may be provided adjacent the top opening 48.

Rather than being anchored to the cover 22, the clip could be independent of the cover 22. If the independent clip 116 were inserted through both zipper pull tabs 47, the top opening 48 or front opening 52 could not be opened, because as one zipper pull tab 47 moves to open the enclosure 20, the other zipper pull tab follows right behind to reclose the enclosure 20. Those of skill in the art will appreciate that the enclosure need not include the security snap clip 116.

In the illustrated embodiment, the exterior surface of the rear panel 32 (FIG. 2) of the cover 22 includes a pocket 55, a zippered pocket 56 and a mesh pouch 58. The pockets 55, 56 and pouch 58 are useful for holding pet accessories, such as food, treats, toys and grooming tools. Those of skill in the art will appreciate that the pockets 55, 56 and pouch 58 could be located anywhere on the cover 22, including the interior surface of the cover 22. Those of skill in the art will further appreciate that the enclosure 20 need not include any pockets or pouches. The cover 22 may also include receptacles (not shown) for containing food and/or water. The receptacles may be located on either the interior or the exterior of the cover 22, and may comprise, for example, rigid or semi-rigid plastic bowls. Alternatively, the cover 22 may include soft pockets for holding rigid or semi-rigid plastic bowls.

The cover preferably includes tabs 118 (FIGS. 1 and 2) for accepting stakes (not shown). The tabs 118 are attached to the cover floor panel 28, or adjacent the floor panel 28. The tabs 118 each include a hole 120, through which a stake can be driven to firmly secure the enclosure 20 to the ground. Each hole 120 is preferably reinforced with a grommet 121, which is preferably constructed of any sturdy material such as metal or high-impact plastic. Those of skill in the art will appreciate that the enclosure need not include the tabs 118.

Figure 19:
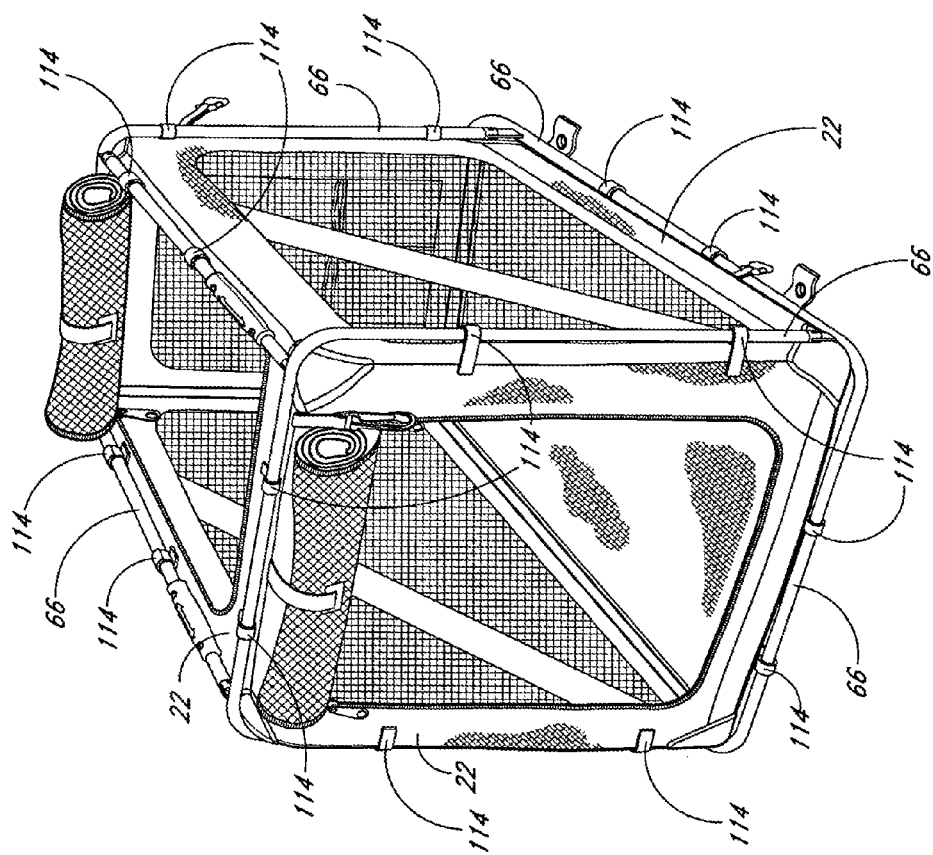
FIG. 19 is a front perspective view of another preferred embodiment of the present pet enclosure, illustrating an external frame.

A rigid frame 24 (FIGS. 3-17) supports the cover 22. In the illustrated embodiment, the frame 24 is internal to the cover 22. Those of skill in the art will appreciate that the frame 24 may be external to the cover 22, as illustrated in FIG. 19. The frame 24 comprises a substantially rectangular floor truss 60, two substantially U-shaped end trusses 62, and jointed support tubes 64 extending between upper edges of the end trusses 62 (FIG. 17).

The word truss, as used herein, is defined as a rigid frame comprised of at least two interconnected members. For example, a truss includes four bars welded to one another to form a rectangular frame. The definition of truss, as used herein, is not exclusive of any manner of attaching the truss members together. The members may be, for example, welded, adhered, riveted, screwed, bolted, nailed, etc, to one another. The members may even be formed integrally with one another. For example, four tubes that are formed as a single piece four-sided frame comprise a truss. The definition of truss, as used herein, is also not exclusive of any material. The truss members may be, for example, metal, plastic, composite, wood, ceramic, etc.

Figure 17:
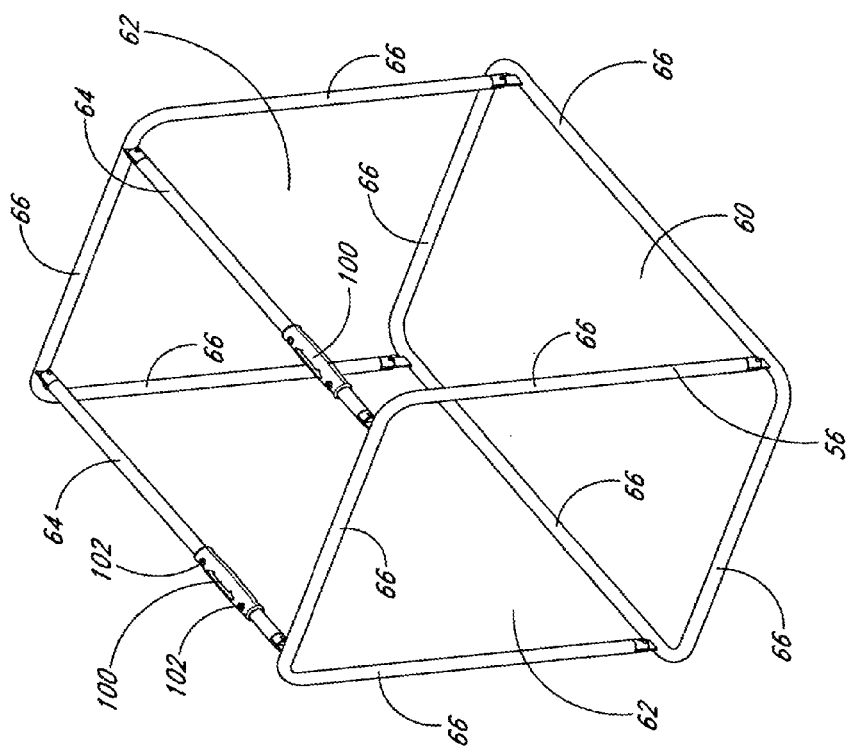
FIG. 17 is a perspective view of the frame of FIG. 3.

The floor truss 60 and the end trusses 62 are each constructed of rigid bars or tubes 66 (FIG. 17). For ease of reference, the tubes 66 will be referred to herein as tubes, even though they could comprise solid bars, as those of skill in the art will appreciate.

The bars or tubes 66 may be made of any suitable rigid material that is preferably lightweight. Preferred materials include, without limitation, metals such as steel or aluminum, plastics, and composites. The illustrated tubes 66 are of circular cross-section. However, those of skill in the art will appreciate that the tubes could be of any cross-section, such as square or hexagonal. The floor truss 60 may comprise a single tube 66 that is bent at right angles in four places and the ends of the tube 66 connected to one another. Alternatively, the floor truss 60 may comprise four separate tubes 66 connected to one another at their ends to form four corners. Preferably, corners of the trusses 60, 62 are somewhat rounded to reduce the likelihood of injury to someone bumping into the frame 24.

Those of skill in the art will appreciate that the frame 24 may be configured differently. For example, if the frame were inverted, the floor truss 60 could be used to support a roof of the enclosure 20. The jointed support tubes 64 would then extend between lower edges of the end trusses 62. The floor truss 60 could also include a floor panel (not shown). For example, a flat rectangular panel could be secured to lower, upper or inner surfaces of the tubes 66 comprising the floor truss 60. The panel could, for example, be made of metal, fiberglass or a composite material, and could be secured to the floor truss 60 by welding or adhesive. Alternatively, the floor truss 60 could be eliminated, and the end trusses 62 could be secured directly to the floor panel.

Figure 16:
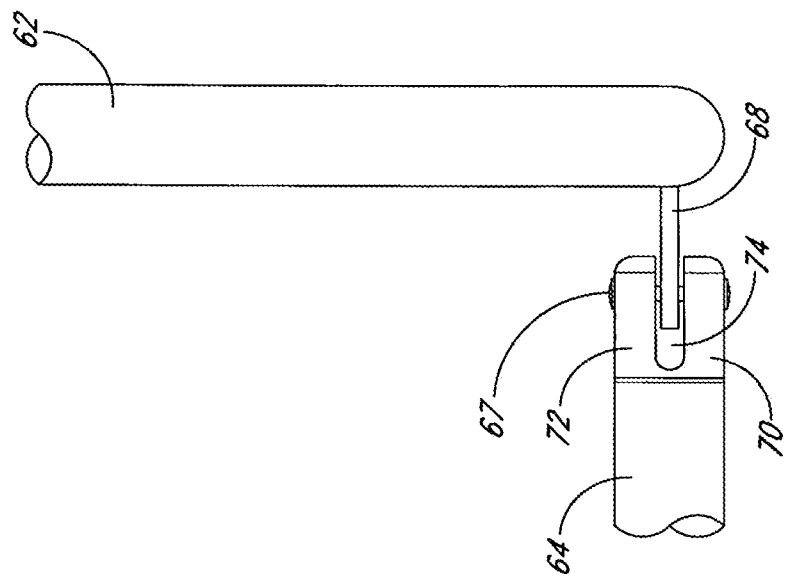
FIG. 16 is a detail view of the frame of FIG. 3, illustrating a hinge joining a support tube and an end truss.
Figure 15:
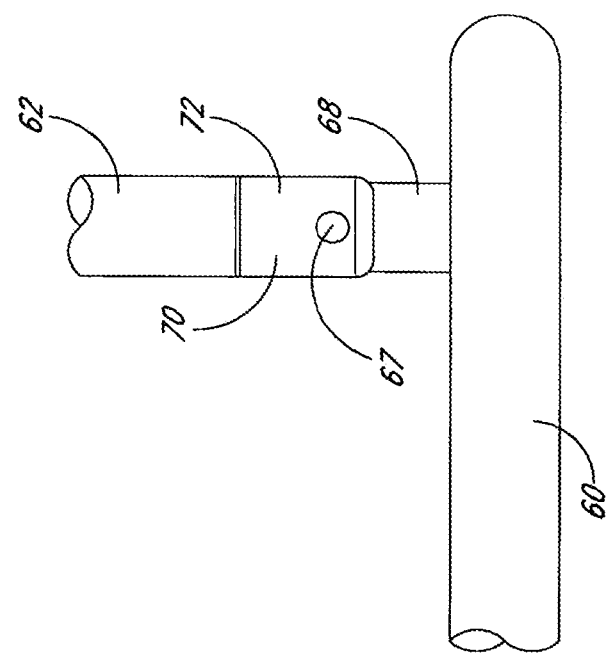
FIG. 15 is a detail view of the frame of FIG. 3, illustrating a hinge joining the bottom truss and an end truss.

Four lugs 68 (FIGS. 3, 4, 15 and 16) are preferably secured to the floor truss 60, one lug 68 near each corner of the floor truss 60. Each lug 68 comprises a substantially rectangular plate that is secured to the floor truss 60 such that a plane defined by each lug 68 is perpendicular to a plane defined by the floor truss 60. Each lug 68 includes a through-hole (not shown) for receiving a hinge pin 67 (FIGS. 15 and 16).

The end trusses 62 are pivotably attached to the lugs 68. Each of the end trusses 62 is preferably three-sided and substantially U-shaped. Like the floor truss 60, the end trusses 62 are constructed of rigid bars or tubes 66. The bars or tubes 66 may be made of any suitable rigid material that is preferably lightweight. Preferred materials include, without limitation, metals such as steel or aluminum, plastics, and composites. The end trusses 62 may comprise a single tube 66 that is bent in two places. Alternatively, the end trusses 62 may comprise three separate tubes 66 connected to one another at their ends to form a U.

A hinge portion 70 (FIGS. 15 and 16) is inserted within the ends of the tube or tubes 66 forming the open end of the U in each end truss 62. Each hinge portion 70 is substantially cylindrical. A first end of the hinge portion 70 resides within the end of the tube 62 in a friction fit. The hinge portions 70 may also be attached to the end trusses 62 by alternate means. For example, if the end trusses 62 comprise solid bars, rather than hollow tubes, the hinge portions 70 may be glued, welded or otherwise attached to the bars. Even when the hinge portions 70 are inserted into tubular panels, the hinge portions 70 may also be secured by gluing, welding or the like for a stronger hold.

A length of each hinge portion 70 extends from the end of the tube 66. This exposed portion 72 includes a longitudinal slit 74 (FIG. 16) that extends through the entire diameter of the hinge portion 70. A transverse through-hole (not shown) extends through the exposed portion 72 and intersects the space defined by the slit 74. The slit 74 is configured to accept a lug 68, such that the through-hole in the hinge-portion 70 aligns with the through-hole in the lug 68. A hinge pin 67 inserted through both through-holes pivotably secures the hinge portion 70 to the lug 68. The two hinge portions 70 at either open end of the end trusses 62, respectively, thus pivotably attach the end trusses 62 to the lugs 68 on the floor truss 60.

Figure 3:
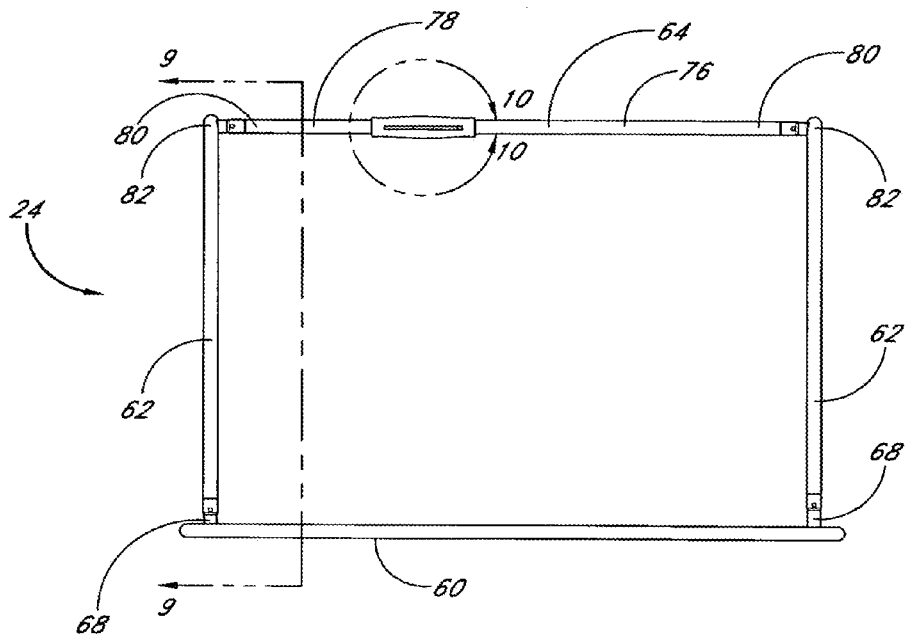
FIG. 3 is a side elevation view of a preferred embodiment of a frame for the pet enclosure of FIG. 1, illustrating the locking sleeves in the locked position.
Figure 4:
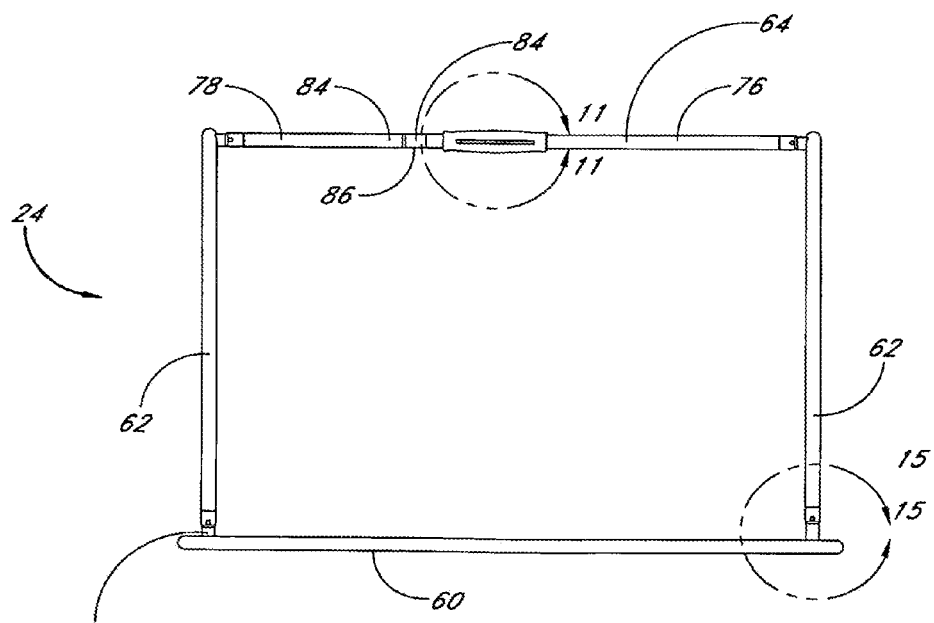
FIG. 4 is a side elevation view of the frame of FIG. 3, illustrating the locking sleeves in the unlocked position.

Each support tube 64 comprises a long portion 76 and a short portion 78 (FIGS. 3 and 4). A first end 80 (FIG. 3) of each portion 76, 78 is pivotably attached to an upper portion 82 of an end truss 62 in a similar manner as the end trusses 62 are pivotably attached to the floor truss 60. Second ends 84 (FIG. 4) of each portion 76, 78 are releasably connectable to each other via a joint 86 (FIGS. 4, 13 and 14). Each joint 86 comprises a female connector 88 having a substantially cylindrical exterior and a substantially cylindrical socket 90 at a first end. Each joint 86 also comprises a male connector 92 having a substantially cylindrical exterior and a substantially cylindrical plug 94 at a first end. An outer diameter of the plug 94 is preferably roughly equal to an inner diameter of the socket 90. The plug 94 is thus snugly slidable within the socket 90.

The exterior of the female connector 88 fits snugly within the second end 84 of the support tube long portion 76. The exterior of the male connector 92 fits snugly within the second end 84 of the support tube short portion 78. The long portion 76 and short portion 78 are thus connectable to one another by insertion of the plug 94 into the socket 90. In this configuration, each support tube 64 becomes a one-piece bar that is rigid in compression and maintains the end trusses 62 in their upright positions, as shown in FIGS. 3 and 4.

A substantially cylindrical passage 96 extends through both the female and male connectors 88, 92. An elastic cord 98 (FIGS. 12, 13 and 14) preferably extends through each passage 96 and is secured at either end to the female and male connectors 88, 92, or in the portions 76, 78. Tension in the elastic cord 98 urges the female and male connectors 88, 92 toward one another. Thus, although each support tube 64 comprises two pieces 76, 78, the elastic cords 98 assist in aligning and securing the two pieces together. Those of skill in the art will appreciate that the elastic cords 98 need not be provided. However, the elastic cords 98 facilitate quick setup of the enclosure 20, as described below. The elastic cords 98 also make the frame 24 more manageable by preventing the detached pieces 76, 78 from flopping around.

Figure 5:
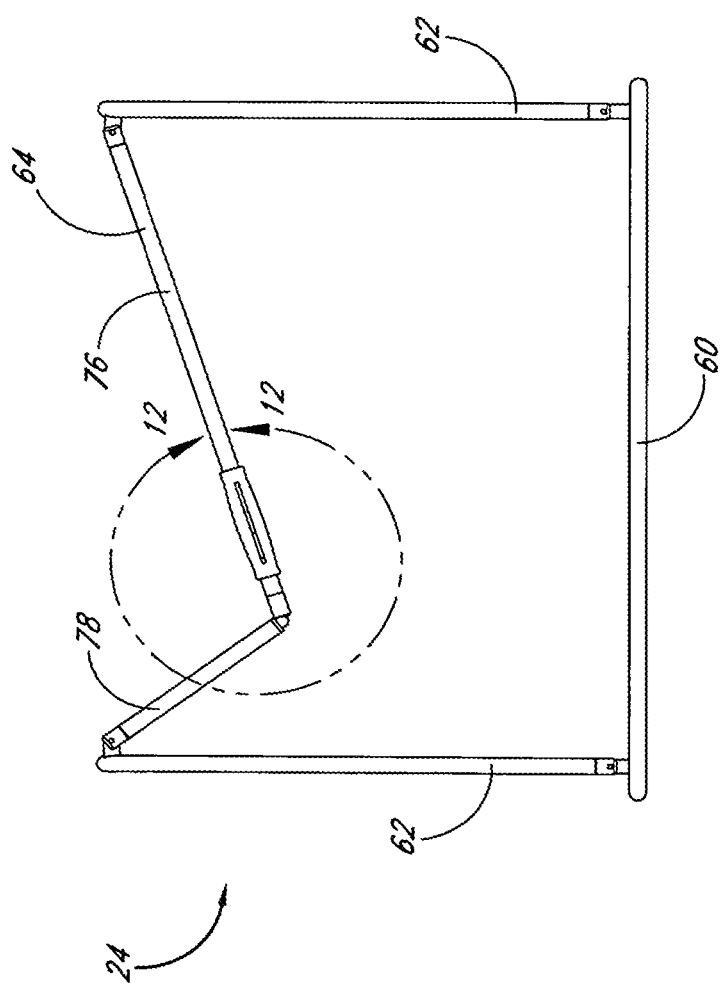
FIG. 5 is a side elevation view of the frame of FIG. 3, illustrating the locking sleeves in the unlocked position and the support tubes bent.
Figure 11:
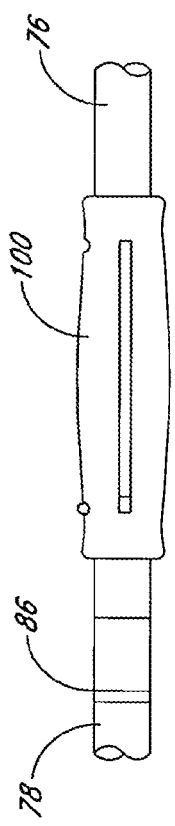
FIG. 11 is a detail view of the frame of FIG. 3, illustrating the joint and locking sleeve in the unlocked position.
Figure 12:
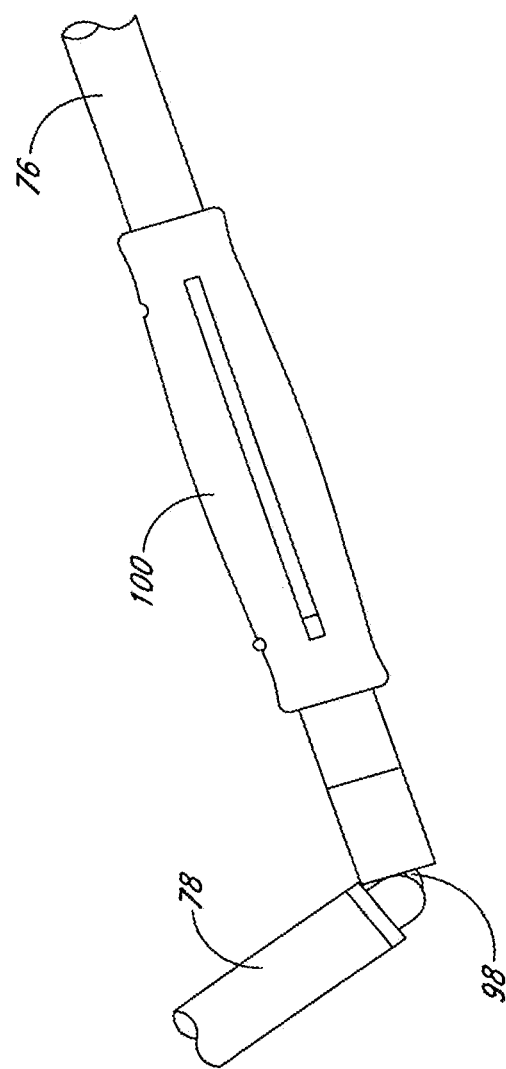
FIG. 12 is a detail view of the frame of FIG. 3, illustrating the locking sleeve in the unlocked position and the joint in the bent position.

Each support tube 64 preferably includes a substantially cylindrical locking sleeve 100 (FIGS. 10-14 and 17). The sleeve 100 is slidable along the support tube 64 from a locked position (FIGS. 10, 13 and 17) to an unlocked position (FIGS. 11, 12 and 14). In the locked position, the sleeve 100 covers the joint 86 between the short and long portions 76, 78 of the support tube 64 and increases the overall rigidity of the support frame 24. In the unlocked position, the sleeve 100 is slid away from the joint 86 such that the short and long portions 76, 78 are easily pulled apart from one another and the support tubes 64 bent as shown in FIG. 5, and in detail in FIG. 12. Preferably, a length of the cover 22 is substantially equal to a length of the support tubes 64. Thus, when the cover 22 is stretched over the frame 24, the cover 22 resists any tendency of the short and long portions 76, 78 to separate from one another.

The sleeve 100 includes two through-holes 102 (FIGS. 13 and 14), one near each end of the sleeve 100. The holes 102 lie along a line that is parallel to a longitudinal axis of the sleeve 100. Near the joint 86, the long portion 76 of each support tube 64 includes a U-shaped, cantilevered leaf spring 104 with a button 106 near a free end. The button 106 protrudes through a hole 108 in a side wall of the support tube 64. The button 106 is aligned with the line joining the two holes 102 on the sleeve 100. Thus, when the sleeve 100 is in the locked position, the button 106 protrudes through one hole 102 in the sleeve 100. As the sleeve 100 slides along the support tube 64 toward the unlocked position, it maintains the button 106 in a depressed position until it reaches the unlocked position, where the button 106 pops up into the other hole 102 in the sleeve 100. The button 106 thus releasably locks the sleeve 100 in either the locked or unlocked position.

The enclosure 20 is foldable into the configuration illustrated in FIG. 18. The front panel 30 is folded approximately ninety-degrees toward the floor panel 28 such that the two panels are substantially parallel. The rear panel 32 is also folded approximately ninety-degrees toward the floor panel 28, such that it rests atop the front panel 30, and is substantially parallel to both the floor panel 28 and the front panel 30. In this configuration, the enclosure 20 comprises a compact flat panel that occupies a fraction of the space that the unfolded enclosure 20 of FIGS. 1 and 2 occupies. The folded enclosure is thus easy to store and easy to transport.

Preferably, the cover 22 includes closure clips 110 (FIGS. 1, 2 and 18), which comprise releasably lockable male and female connectors. The clips 110 secure the enclosure 20 in the folded configuration as shown in FIG. 18. The enclosure 20 cover 22 may also include a side handle 112 (FIG. 2) to enable easy carrying of the folded enclosure 20. Alternatively, the enclosure 20 may include a bag (not shown) into which the folded enclosure 20 may be inserted for easy carrying or storage. Additional handles (not shown) may also be provided to facilitate carrying of the enclosure 20 when the enclosure 20 is in the unfolded configuration as in FIG. 1. The handles could be conveniently positioned along the upper edges of the cover 22 to enable a pet owner to pick up the enclosure 20, perhaps with a pet inside, and carry it to a different location. The handles could alternatively be secured directly to the frame 24, and could protrude through apertures (not shown) in the cover 22, if the frame 24 is internal.

The procedure for folding the enclosure 20 is illustrated in FIGS. 3-7. For clarity, the procedure is illustrated with the cover 22 removed from the frame 24. However, most pet owners will likely prefer to fold the enclosure without first removing the cover 22, because such removal is unnecessary for storage or transportation of the enclosure 20.

The pet owner first unzips the top opening 48 and removes the pet and other articles from the enclosure 20. Next, the pet owner depresses the button 106 and slides both locking sleeves 100 from the locked position (FIG. 3) to the unlocked position (FIG. 4). The owner then pushes downward on the support tubes 64 at or near the joints 86 so that the support tubes 64 bend (FIG. 5). Advantageously, the elastic cords 98 retain the portions 76, 78 of the support tubes 64 in close proximity. The elastic cords 98 thus guide the support tubes 64 to their desired orientations during folding so that the owner does not have to guide them with his or her hand.

Figure 6:
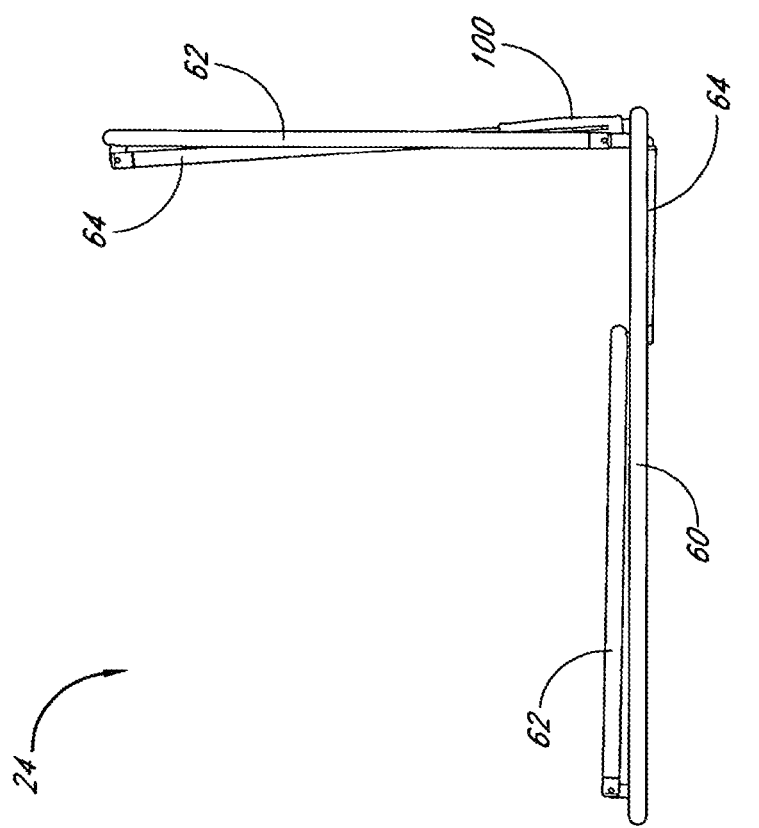
FIG. 6 is a side elevation view of the frame of FIG. 3, illustrating a first end truss in a folded position.

Next, the owner folds downward the end truss 62 that is connected to the short portions 78 of the support tubes 64 (FIG. 6). In the illustrated embodiment, the first-folded end truss 62 corresponds to the front panel 30 (FIGS. 1, 2 and 18). However, those of skill in the art will appreciate that the orientation of the cover 22 relative to the frame 24 may be reversed such that the end truss 62 corresponds to the rear panel 32. In such an orientation, the owner would fold the rear panel 32 first.

As the owner folds the first end truss 62, the short portions 78 pivot about the lugs 68 toward the first end truss 62. When a plane defined by the first end truss 62 is substantially parallel to the long portions 76, the short portions 78 begin to pivot in the opposite direction. The short portions 78 continue to pivot in this direction until the plane defined by the first end truss 62 is substantially parallel to a plane defined by the floor truss 60. In this configuration, shown in FIG. 6, the short portions 78 are substantially parallel to the plane defined by the first end truss 62 and extend away from the first end truss 62.

Figure 7:
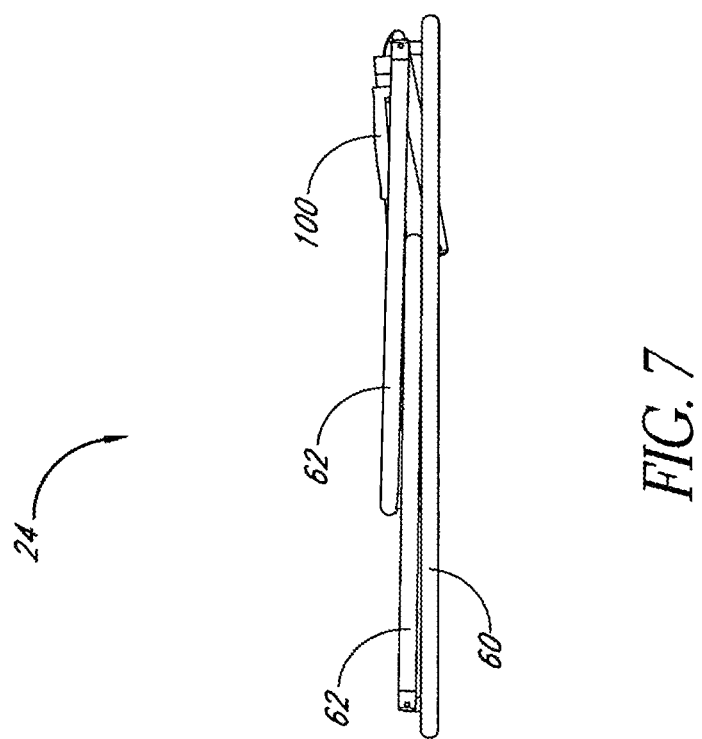
FIG. 7 is a side elevation view of the frame of FIG. 3, illustrating the frame in the folded position.
Figure 9:
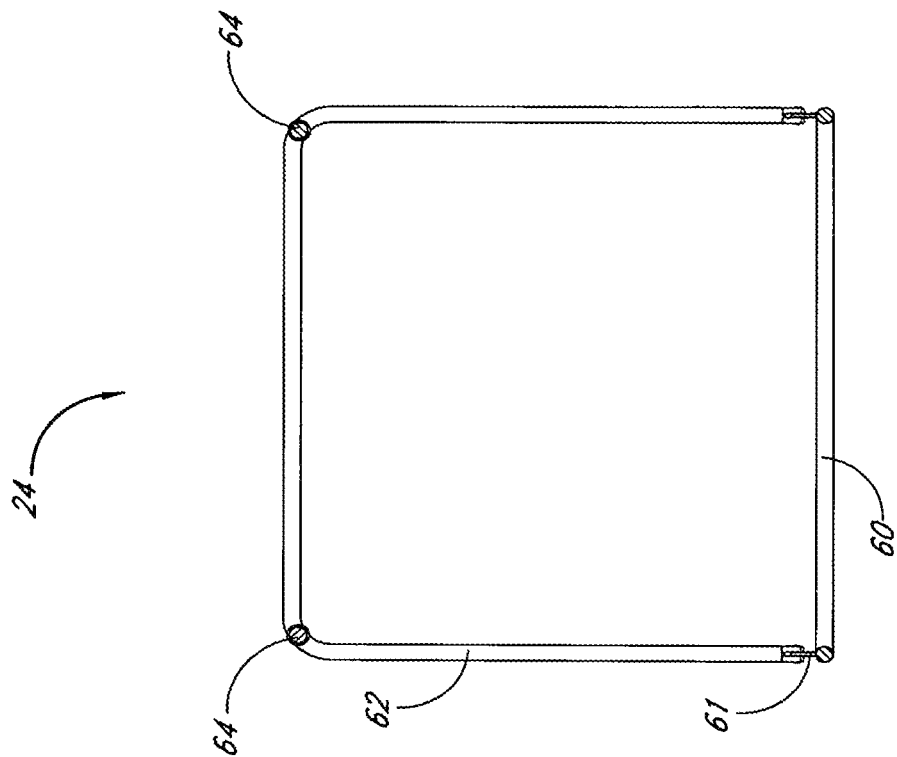
FIG. 9 is a cross-sectional end view of the frame of FIG. 3, taken through the line 9-9.
Figure 8:
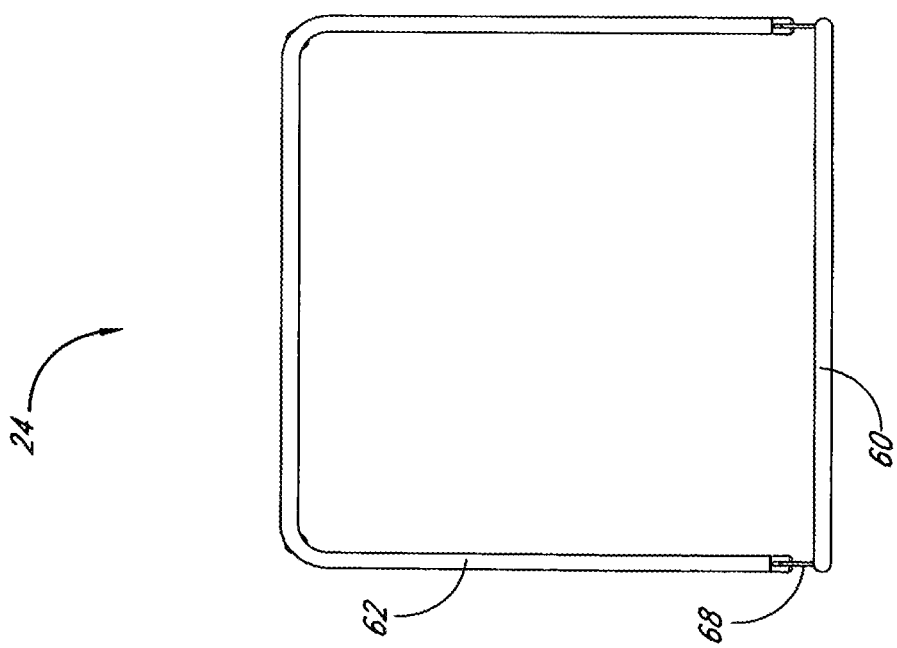
FIG. 8 is an end elevation view of the frame of FIG. 3.
Figure 10:
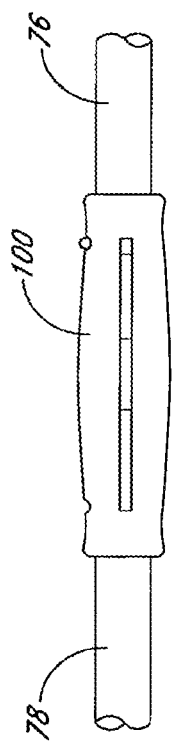
FIG. 10 is a detail view of the frame of FIG. 3, illustrating the joint and locking sleeve in the locked position.

Tucking the cover 22 inside, the owner then folds downward the remaining end truss 62 so that it rests on top of the first-folded end truss 62 (FIGS. 7 and 18). Preferably, the lugs 68 to which the second-folded end truss 62 are attached are somewhat longer than the lugs 68 to which the first-folded end truss 62 are attached. Thus, when the second panel is folded on top of the first, the panels 62 are able to occupy spaced parallel planes. The enclosure 20 is thus able to fold more compactly. To facilitate tighter nesting between the end trusses 62, the end trusses 62 may have different widths. For example, the end truss 62 that is folded first may be narrower than the end truss 62 that is folded second. The parallel legs of the first-folded end truss 62 would then nest inside the parallel legs of the second-folded end truss 62.

Preferably, inside surfaces of the cover 22 that abut the frame 24 include straps 114 (FIG. 2). The straps 114 include releasable securing means, such as snaps or hook-and-loop fastener. The straps 114 are wrapped around the tubes 66 of the end trusses 62 to more securely fasten the cover 22 to the frame 24. Thus, as the owner folds the enclosure 20, the cover 22 follows the motion of the end trusses 62. Those of skill in the art will appreciate that the straps 114 need not be provided.

If the cover 22 is external to the frame 24, the cover 22 preferably includes straps 114 on its outside surfaces, as shown in FIG. 19. The straps 114 secure the cover 22 to the frame 24 so that the flexible cover 22 does not collapse under its own weight. When the enclosure 20 is folded, the straps 114 also allow the cover 22, to follow the motion of the end trusses 62.

To secure the enclosure in the folded configuration shown in FIG. 18, the owner secures the mating ends of the closure clips 110 together. The owner can thus grasp the handle 112 and carry the enclosure 20 in an upright plane without gravity unfolding the enclosure 20.

The procedure for unfolding the enclosure 20 comprises, in reverse order, the steps from the folding procedure just described. Again, the elastic cords 98 advantageously guide the support tube portions 76, 78 to the aligned position of FIG. 5. The owner thus need not guide them himself or herself, which would add complexity to the unfolding procedure.

Advantageously, the frame 24 of the present enclosure 20 is made up of jointed pieces that are all attached to one another, even when the enclosure 20 is completely folded. The separate portions 76, 78 of the support tubes 64 are secured to one another with the elastic cord 98. The frame 24 is thus manipulable as one piece, and is portable as one piece. There are no extra components to keep track of.

As those of skill in the art will appreciate, the elastic cords 98 need not be provided. In an embodiment of the enclosure 20 that does not include the elastic cords 98, folding would proceed substantially as described above. However, rather than bending the support tubes 64 at or near the joints 86, the owner would separate the pieces 76, 78 and allow each one to pivot to an orientation wherein each hung parallel to the end trusses 62. The owner would then fold the end trusses 62 as described above, securing each piece 76, 78 under its respective end truss 62. In addition, each interconnected member of a truss may be secured to the other interconnected member(s) through the use of other hinged arrangements or securement devices. For example, the members may be welded to one another or formed of one integral piece.

The cover 22 of the present enclosure 20 is completely removable from the support frame 24. To remove the cover 22, the owner first detaches the cover from the frame 24 by reaching through one of the openings 48, 52 and unfastening the straps 114 (if straps 114 are provided) from the tubes 66. The owner then folds the frame 24 by following the procedure described above. However, the owner folds the frame 24 independently of the cover 22. The owner can then easily remove the compact folded frame 24 from the cover 22 by passing it through one of the openings 48, 52.

The cover 22 is thus easily washable, because it can be machine washed when separated from the frame 24. Also, an owner may easily replace a worn-out cover 22 without having to purchase an entire enclosure 20. An owner may also purchase additional covers 22 in different colors. The owner may then change the cover 22 as needed to, for example, match a room's decor.

SCOPE OF THE INVENTION

The above presents a description of the best mode contemplated for carrying out the present pet enclosure, and of the manner and process of making and using it, in such full, clear, concise and exact terms as to enable any person skilled in the art to which it pertains to make and use this pet enclosure. This pet enclosure is, however, susceptible to modifications and alternate constructions from that discussed above that are fully equivalent. Consequently, this pet enclosure is not limited to the particular embodiments disclosed. On the contrary, this pet enclosure covers all modifications and alternate constructions coming within the spirit and scope of the pet enclosure as generally expressed by the following claims, which particularly point out and distinctly claim the subject matter of the pet enclosure.

What is claimed is:

1. A pet enclosure comprising:
    an expandable cover that comprises a roof, a floor opposite the roof, and a plurality of sides connecting the roof to the floor, wherein the plurality of sides includes a first side and a second side opposite the first side; and
    a collapsible support frame that comprises:
        a first truss adjacent the first side of the cover;
        a second truss adjacent the second side of the cover; and
        a support member extending from the first truss to the second truss, the first truss and the second truss being pivotable relative to the support member toward one another into a collapsed configuration of the support frame and away from one another into an uncollapsed configuration of the support frame, wherein pivoting the trusses from the collapsed configuration into the uncollapsed configuration rearranges the cover from an unexpanded arrangement of the cover into an expanded arrangement of the cover, the cover in the expanded arrangement defining an interior compartment for housing a pet.

2. The pet enclosure of claim 1, wherein the pet enclosure is configured for transporting a pet housed in the interior compartment.

3. The pet enclosure of claim 2, wherein one of the cover and the support frame comprises a handle for carrying the pet enclosure when a pet is housed in the interior compartment.

4. The pet enclosure of claim 1, wherein the cover comprises a door configurable between a closed position and an open position to permit a pet to enter and exit the interior compartment in the expanded arrangement of the cover.

5. The pet enclosure of claim 4, wherein the cover has a zipper for securing the door in the closed position, and wherein the zipper is not configured for being unzipped from within the interior compartment when the door is secured in the closed position.

6. The pet enclosure of claim 1, wherein the support frame further comprises a brace sized to extend from the first truss to the second truss opposite the support member to prevent the trusses from pivoting toward one another and to maintain the support frame in the uncollapsed configuration.

7. The pet enclosure of claim 6, wherein the support member and the brace are substantially parallel when the brace extends from the first truss to the second truss.

8. The pet enclosure of claim 7, wherein the support member extends from the first truss to the second truss along the roof, and wherein the brace extends from the first truss to the second truss along the floor.

9. The pet enclosure of claim 1, wherein the first truss and the second trusses overlap in the collapsed configuration of the support frame.

10. The pet enclosure of claim 9, wherein the first truss and the second truss pivot approximately ninety-degrees toward the support member from the uncollapsed configuration to the collapsed configuration such that, in the collapsed configuration, the first truss rests atop of the support member, and the second truss rests atop of the first truss, orienting the first cover portion and the second cover portion substantially parallel to one another.

11. The pet enclosure of claim 1, wherein the support member has a first end and a second end, the first truss being connected to support member adjacent the first end via a first hinge and the second truss being connected to the support member adjacent the second end via a second hinge.

12. A pet enclosure comprising:
an expandable cover that comprises:
  a roof;
  a floor opposite the roof; and
  a plurality of sides connecting the roof to the floor, wherein the plurality of sides includes a first side, a second side opposite the first side, a third side extending from the first side to the second side, and a fourth side extending from the first side to the second side opposite the third side; and
a collapsible support frame that comprises:
  a first truss adjacent the first side;
  a second truss adjacent the second side; and
  a support member extending from the first truss to the second truss along one of the roof and the floor; and
  a brace sized to extend from the first truss to the second truss along the other of the roof and the floor, wherein the first truss and the second truss are maintained in a substantially parallel, upright orientation relative to one another when the brace is positioned to extend from the first truss to the second truss such that the support frame assumes an uncollapsed configuration and arranges the cover in an expanded arrangement in which the cover defines an interior compartment for housing a pet, and wherein the first truss and the second truss are pivotable toward one another relative to the support member when extension of the brace from the first truss to the second truss is removed such that the support frame assumes a collapsed configuration and rearranges the cover into an unexpanded arrangement in which the cover does not define the interior compartment for housing a pet.

13. The pet enclosure of claim 12, wherein the first side and the second side of the cover are substantially parallel to one another in the expanded arrangement of the cover.

14. The pet enclosure of claim 13, wherein the first side and the second side of the cover are substantially parallel to one another in the unexpanded arrangement of the cover.

15. The pet enclosure of claim 14, wherein the first side and the second side of the cover overlap in the unexpanded arrangement of the cover.

16. The pet enclosure of claim 12, wherein the third side and the fourth side of the cover are substantially parallel to one another, and are substantially perpendicular to the first side and the second side of the cover, in the expanded arrangement of the cover.

17. The pet enclosure of claim 12, wherein, by pivoting the first truss and the second truss away from one another into the upright orientation from the collapsed configuration of the support frame, the cover is rearranged into the expanded arrangement in which the third side and the fourth side are oriented substantially parallel to one another and substantially perpendicular to the first side and the second side, and in which the other of the roof and the floor is oriented substantially parallel to the one of the roof and the floor.

18. The pet enclosure of claim 12, wherein the pet enclosure is configured for transporting a pet housed in the interior compartment.

19. The pet enclosure of claim 18, wherein one of the cover and the support frame comprises a handle for carrying the pet enclosure when a pet is housed in the interior compartment.

20. A pet enclosure, comprising:
a rigid, rectangular floor panel;
a first rigid end truss positioned adjacent a first end of the floor panel;
a second rigid end truss positioned adjacent a second end of the floor panel;
a rigid support member extending between upper ends of the first and second rigid end trusses; and
a fabric cover disposed about the floor panel and the support member;
wherein, the cover includes a floor panel, a top panel, first and second side panels, and first and second end panels, the floor panel of the cover being constructed of a durable, substantially non-breathable material, at least one of the first and second side panels, and at least one of the first and second end panels including breathable mesh material portions, the front panel further including a front recloseable opening, a portion of the front recloseable opening being permanently secured to the cover, and a remaining portion of the front recloseable opening being releasably secured to the cover.

* * * * *